US011217054B2

(12) United States Patent
Junes et al.

(10) Patent No.: US 11,217,054 B2
(45) Date of Patent: Jan. 4, 2022

(54) ACCESS GATE ARRANGEMENT

(71) Applicant: KONE CORPORATION, Helsinki (FI)

(72) Inventors: Jouni Junes, Hämeenlinna (FI); Kim Bergman, Helsinki (FI)

(73) Assignee: KONE CORPORATION, Helsinki (FI)

(*) Notice: Subject to any disclaimer, the term of this patent is extended or adjusted under 35 U.S.C. 154(b) by 0 days.

(21) Appl. No.: 16/025,602

(22) Filed: Jul. 2, 2018

(65) Prior Publication Data
US 2018/0315263 A1 Nov. 1, 2018

Related U.S. Application Data

(63) Continuation of application No. PCT/FI2016/050141, filed on Mar. 9, 2016.

(51) Int. Cl.
G07C 9/38 (2020.01)
G07C 9/00 (2020.01)
B61L 27/00 (2006.01)
G05B 15/02 (2006.01)
G07C 11/00 (2006.01)

(52) U.S. Cl.
CPC ............ G07C 9/38 (2020.01); B61L 27/0077 (2013.01); G05B 15/02 (2013.01); G07C 9/00 (2013.01); G07C 2011/04 (2013.01)

(58) Field of Classification Search
CPC . B61L 27/0077; G05B 15/02; G07C 2011/04; G07C 9/00; G07C 9/00166
See application file for complete search history.

(56) References Cited

U.S. PATENT DOCUMENTS

2005/0093697 A1* 5/2005 Nichani ................. G06T 7/593
340/545.1
2008/0195257 A1* 8/2008 Rauch .................... G08G 1/127
701/1
(Continued)

FOREIGN PATENT DOCUMENTS

| CN | 101763667 A | 6/2010 |
| CN | 101950440 A | 1/2011 |
| CN | 102101614 A | 6/2011 |

(Continued)

OTHER PUBLICATIONS

International Search Report for PCT/FI2016/050141 (PCT/ISA/210) dated Oct. 7, 2016.
(Continued)

Primary Examiner — Chad G Erdman
(74) Attorney, Agent, or Firm — Birch, Stewart, Kolasch & Birch, LLP

(57) ABSTRACT

Managing passenger flows is an important issue in modern buildings. Particularly in high buildings there will be a lot of people arriving and leaving typically through one access floor. When passenger flows are not managed and passengers are not instructed facilities of buildings are not in optimal use. People may be queuing for one elevator group when another elevator group is not used in full capacity. This can be improved by using an access gate arrangement where the controller of the access gate arrangement receives information from external systems in the building.

7 Claims, 4 Drawing Sheets

(56) References Cited

U.S. PATENT DOCUMENTS

2012/0090922 A1* 4/2012 Elomaa ................ B66B 1/2458
  187/247
2016/0295196 A1* 10/2016 Finn .......................... B66B 3/02

FOREIGN PATENT DOCUMENTS

| CN | 105060047 A | | 11/2015 | | |
|----|----|----|----|----|----|
| CN | 105324322 A | | 2/2016 | | |
| JP | 02011126690 A | * | 6/2011 | ............... | B66B 1/18 |
| JP | 2011126690 A | * | 6/2011 | ............... | B66B 1/18 |
| JP | 2016035665 A | * | 3/2016 | | |
| WO | WO 2006/018304 A2 | | 2/2006 | | |
| WO | WO 2010/139846 A1 | | 12/2010 | | |
| WO | WO 2014/121329 A1 | | 8/2014 | | |
| WO | WO 2015/168406 A1 | | 11/2015 | | |

OTHER PUBLICATIONS

Written Opinion of the International Preliminary Examining Authority for PCT/FI2016/050141 (PCT/IPEA/408) dated Feb. 27, 2018.
Written Opinion of the International Searching Authority for PCT/FI2016/050141 (PCT/ISA/237) dated Oct. 7, 2016.

* cited by examiner

ACCESS GATE ARRANGEMENT

CROSS REFERENCE TO RELATED APPLICATIONS

This application is a Continuation of PCT International Application No. PCT/FI2016/050141, tiled on Mar. 9, 2016, all of which are hereby expressly incorporated by reference into the present application.

DESCRIPTION OF BACKGROUND

Controlling people and traffic flows is an important but difficult problem to solve. Typically the locations where lot of traffic is expected multiple solutions are used in order to control the movement of persons or vehicles.

One often in indoors used solution is a destination control system for elevators. When a person arrives at an elevator lobby he or she indicates to the destinations control system a destination floor. The destination control system then allocates an elevator ride and instructs the person to go to the correct elevator. Thus, the destination control system is able to group people so that the elevator system is used as efficiently as possible. Furthermore, the destination control system knows or has at least a good estimate of the number of persons travelling in the building.

It is furthermore common that, for example, elevators are driven taking statistics, time and calendar into account. For example, in an office building it is normal that traffic in the morning is from the lobby to the office floors and in late afternoon or early evening opposite direction. During the day, for example, a lunch break can cause different behavior in different buildings. For example, the lunch restaurant may be located in first floor, top floor or both. When the statistics are known elevators can be driven so that if they need to wait they wait at floors from which there is more traffic. Another more simple rule is to try to keep at least one elevator in the lobby level because lobby level sees more traffic than other floors.

One point for collecting reliable statistics is an access gate or the access gate arrangement provided in floors of entrance. With the access information it is possible to collect very reliable statistics for further use. Access gates are naturally used for providing access to the building. Thus, even if statistics can be collected at the access gate the main function of the access gate is to provide access only when the passenger is authorized to enter the building. It is possible that collecting statistics is regulated in some countries because of privacy reasons.

The above described flow control is in constant need of improvements because the optimal solution is hard to find. Furthermore, it is desirable that the people flows will flow fluently as it will increase the use of capacity and reduces travelling times.

SUMMARY

Managing passenger flows is an important issue in modern buildings. Particularly in high buildings there will be a lot of people arriving and leaving typically through one access floor. When passenger flows are not managed and passengers are not instructed facilities of buildings are not in optimal use. People may be queuing for one elevator group when another elevator group is not used in full capacity. This can be improved by using an access gate arrangement where the controller of the access gate arrangement receives information from external systems in the building.

In an embodiment a method for changing state of an access gate is disclosed. The method comprises receiving data from at least one external apparatus regarding passenger flows, processing said received data, determining a state for a gate arrangement and applying the state to said gate arrangement. In another embodiment the method further comprises providing instructions to persons passing said gate arrangement. In an embodiment provided instructions comprise instructions for choosing an elevator or an elevator group.

In an embodiment data regarding passenger flows is received from at least one of the following: a destination control system for elevators, camera arrangement, escalator, train control system, light gate and automatic doors.

In an embodiment the method disclosed above is implemented as a computer program comprising code adapted to cause the method according to any of claims when executed on a data-processing system.

In an embodiment an apparatus comprising at least one processor configured to execute computer programs, at least one memory configured to store computer programs and data and at least one data communication connection configured to communicate with external apparatuses is disclosed. The apparatus is configured to control an access gate arrangement by performing a method as disclosed above.

In an embodiment the apparatus is connected to at least one of the following: a destination control system for elevators, camera arrangement, escalator, train control system, light gate and automatic doors.

In an embodiment an access gate arrangement comprising an apparatus disclosed above is disclosed.

The benefits of described embodiments include improved fluency in passenger flows. The benefits are achieved through better use of the capacity of existing transportation facilities, such as elevators, escalators and access gates. The better use and fluency lead into cost savings as when transportation means are used more efficiently money and space can be saved when constructing buildings. The savings are facilitated by the reduced need for, for example, elevators and escalators. A further benefit of the disclosed access gate arrangement is that the passengers in the building will have better travelling experience and they will save time.

A further benefit of the disclosed access gate arrangement is that it can particularly well manage situations that cannot be estimated based on statistics or schedules. For example, embodiments described above can handle a situation where a conference or other event involving a lot of people will end 15 minutes early or late. Another example of such situation is that one or more busses arrive at the building and the people travelling on buses will enter to the building at the same time.

A further benefit of the disclosed access gate arrangement is that it does not require collecting information about individual passengers, for example, in form of databases or similar. The disclosed access gate arrangement can adapt to the current situation without any preliminary information even if the preliminary information may be used for improving the results derived from the real time information.

BRIEF DESCRIPTION OF THE DRAWINGS

The accompanying drawings, which are included to provide a further understanding of the access gate arrangement and constitute a part of this specification, illustrate embodiments and together with the description help to explain the principles of the access gate arrangement. In the drawings.

DETAILED DESCRIPTION

Reference will now be made in detail to the embodiments, examples of which are illustrated in the accompanying drawings.

Figure 1:
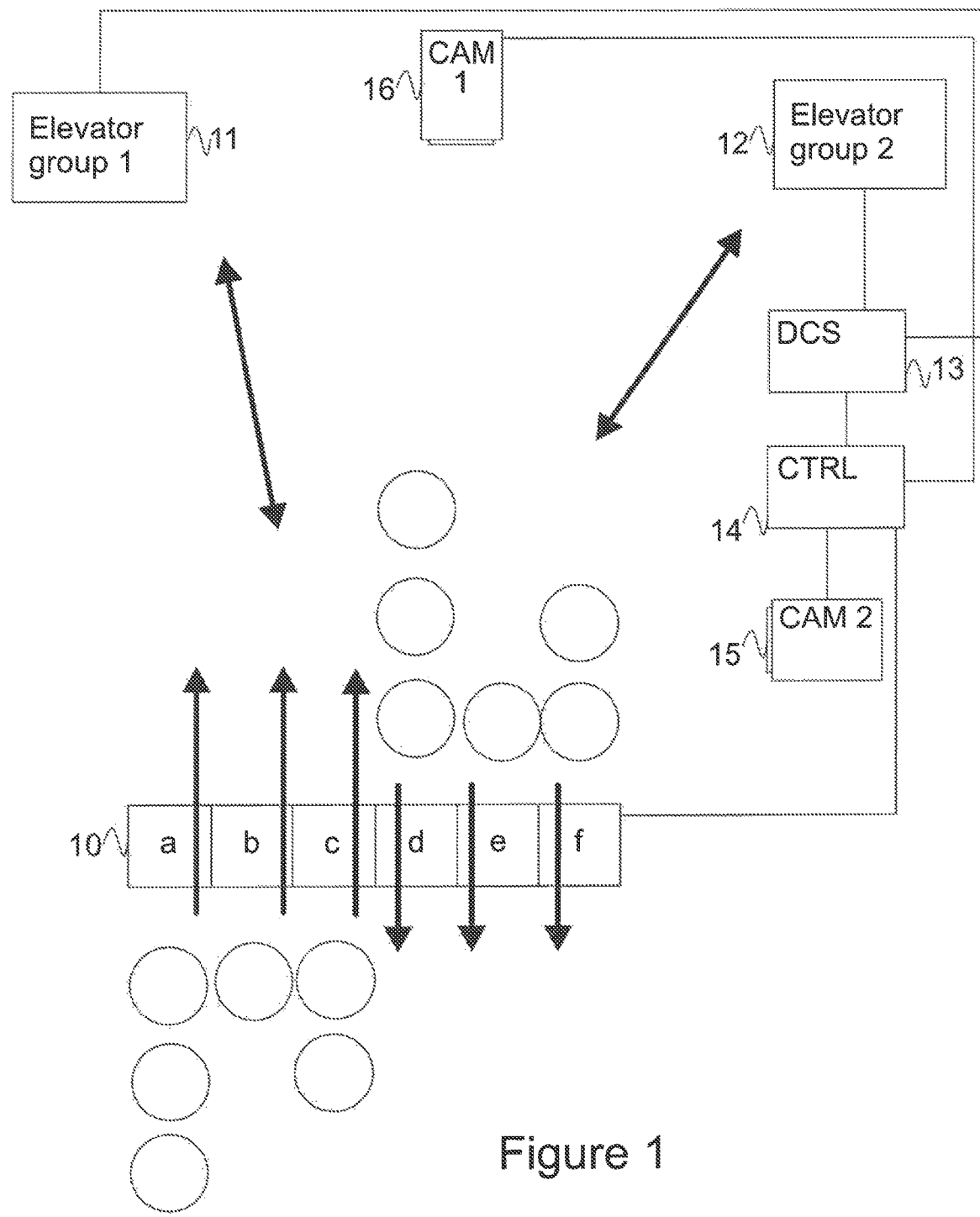
FIG. 1 is a block diagram of an example embodiment of an access gate arrangement.

In FIG. 1 a block diagram of an access gate arrangement is disclosed. The access gate arrangement 10 comprises six access gates 10a-10f. The individual gates 10a-10f are controllable in manner that they may be configured into one-way mode. In FIG. 1 gates 10a-10c are letting people in and gates 10d-10f are letting people out. This is an example of a neutral configuration and could be applied to moments when there is no need for prioritizing either of directions. The direction of gates can be changed as it will be described below.

The access gate arrangement 10 is provided to prevent unauthorized access to elevator groups 11 and 12 as shown in the figure. The elevator groups may be of different configuration and size. Elevator groups are connected to a destination control system 13. It is obvious that the elevators may be connected to also other central systems, for example, for security reasons. In the figure only control unit for destination control system is shown. The system further comprises a number of control panels so that persons waiting elevator can place their calls on the control panels. The number of control panels is not limited but there may be more than one for a group or in some cases two groups may share one.

The destination control system is further configured to provide information to a controller controlling the access gate arrangement. In the figure the controller is further configured to receive image information from two imaging units 15 and 16. The number of imaging units is only an example and the number may be also different. Furthermore, the controller may be further connected to additional external systems that can control or measure people flows.

The controller 14 of FIG. 1 is configured to transmit and receive information to/from external systems. The controller 14 is furthermore configured to provide fluent passenger flow by controlling the access gates so that the flows are as fluent as possible. Even if it is not shown in the figure, it is obvious that each of the individual gates has an indicator that will tell to which direction the gate is open. This can be provided, for example, by using green and red light as they are widely understood.

In FIG. 1 the connection types between different controllers and apparatuses are not shown. The communication between different devices can be done by using any conventional communication method, such as wireless local area networks, mobile communication networks, short distance wireless communication arrangements or any wired network communication arrangement. It is typical that the apparatuses, such as access gate arrangements, destination control systems, camera arrangements and similar are equipped with electricity and thus they can also be reached by using wired telecommunication means if desired.

In FIG. 1 people are moving fluently to elevators and out of the building. The operation of the gates may be set by statistics, calendar or person using manual settings.

Figure 2:
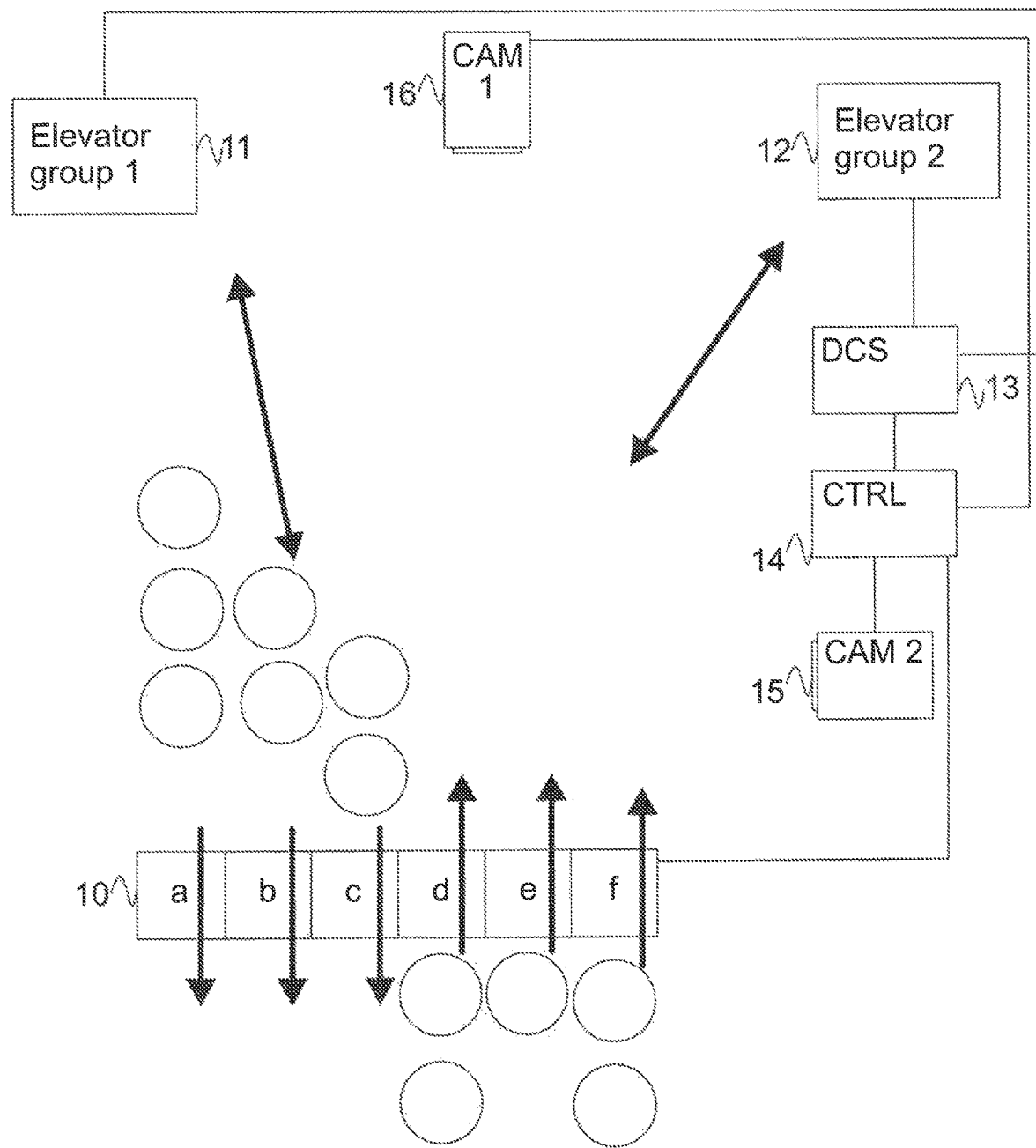
FIG. 2 is a block diagram of another example of the access gate arrangement shown in FIG. 1.

In FIG. 2 the situation has changed so that an event located in a space located higher in the building that is served by the first elevator group 12 has ended. Thus, a group of people will start placing calls for the first elevator group 12.

As we can see from the figure it would be beneficial in such case to guide people out through gates 10a and 10b. The controller 14 receives information from the destination control system 13. At the same time the controller 14 receives information from the camera system 15, 16 that a plurality of people is approaching the gate arrangement from outside. Based on the changed conditions the gate arrangement changes the direction of gates as shown in the FIG. 2.

The change shown in FIG. 2 is a simple one and comprises change of direction of all gates. However, it clearly facilitates more fluent passenger flows because it is assumed that from elevator group 1 there will be a lot of people coming to the lobby.

Figure 3:
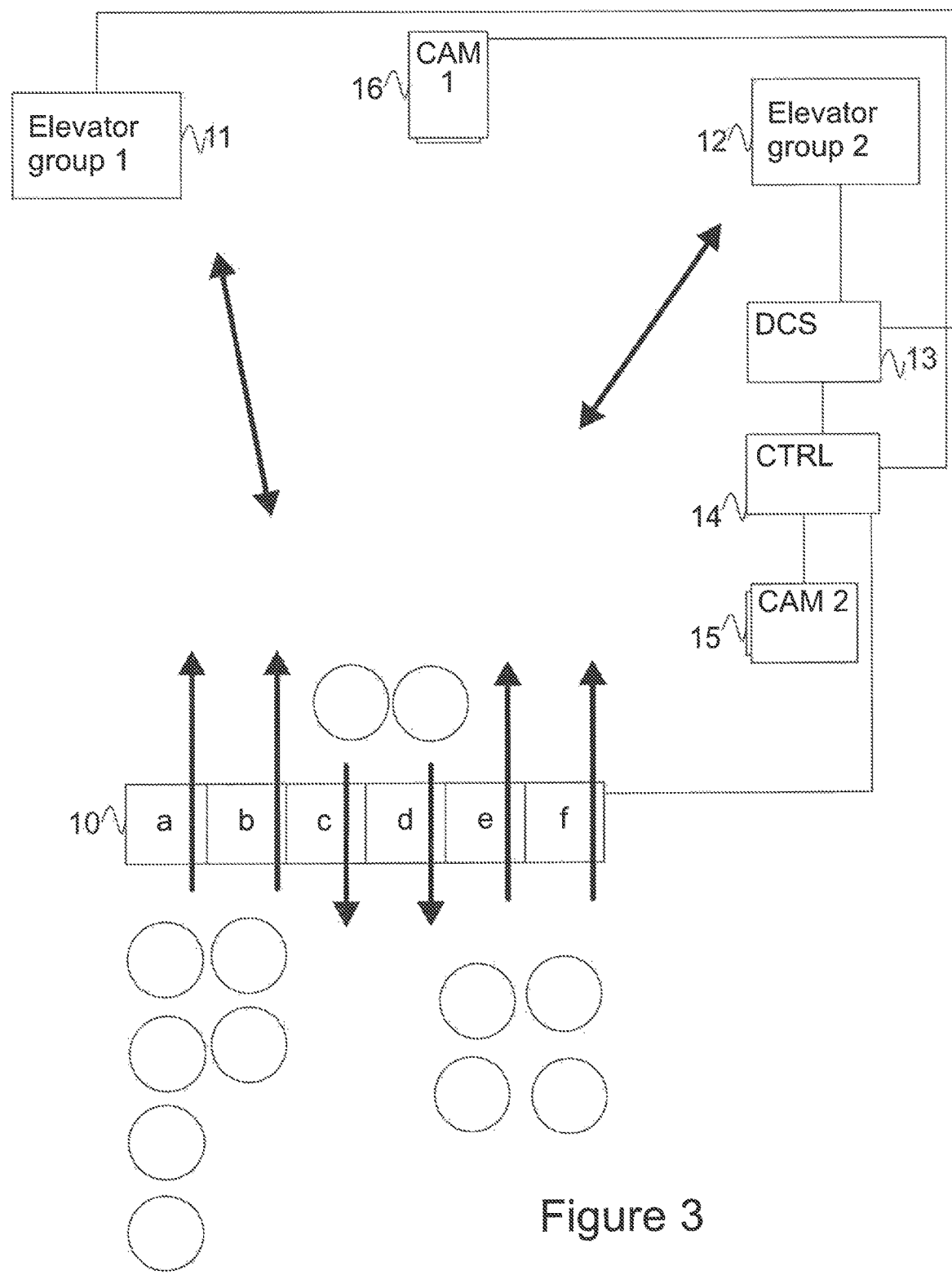
FIG. 3 is a block diagram of another example of the access gate arrangement shown in FIG. 1.

In FIG. 3 a further example is shown. In the figure an example of morning hours is illustrated. Thus, a lot of people will arrive at the building for a working day. Persons going through individual gates a and b will be guided to the first elevator group 11 and persons going through individual gates e and f will be guided to the second elevator group 12. The guidance can be done, for example, by showing instruction on a screen that is integrated to the gate. The people leaving the building will be guided through individual gates c and d. Thus, there is more capacity going in than coming out.

The instructions mentioned above are representing an internal state of the system so that when a person is guided to a certain direction the internal state of the system indicates that is the best route to the destination. This can be because of the shortest or fastest route. The shortest route needs not to be fastest because the shortest route may be overcrowded. Furthermore, the internal state of the system may include information that might be relevant for handicapped people.

In the examples discussed above changes are made based on people flows that are expected in the near future based on observations made by destination control system or a camera system. Additional systems capable of providing similar information may also be used. The controller 14 will combine the received information and will change the gate operation accordingly based on the source and expected destination of people flows.

The controller 14 may be integrated to the gate arrangement 10 or it may be a computer located somewhere else, such as control center. The controller is typically a server having at least one processor, at least one memory and at least network connection. In some embodiments the controller may be a virtual server so that it will share resources in a server or a number of servers, such as a computing cloud.

In the embodiments disclosed above each individual gate have a display for indicating instructions. In case there is no need for showing instructions the display may be used for showing other information, such as time and date or marketing material. It is understood that the access gate needs to be opened by using access means, such as key card or similar. This information may be combined to the instructions. For example, when a person entering the building introduces the key card at the gate, the controller may detect that the person can access only one floor. In such case the controller may send a request to the destination control system and place the call or request information about which elevators are going to the floor the person is probably going to place the call. After all receiving the information the controller can generate instructions and show them to the person at the gate.

Figure 4:
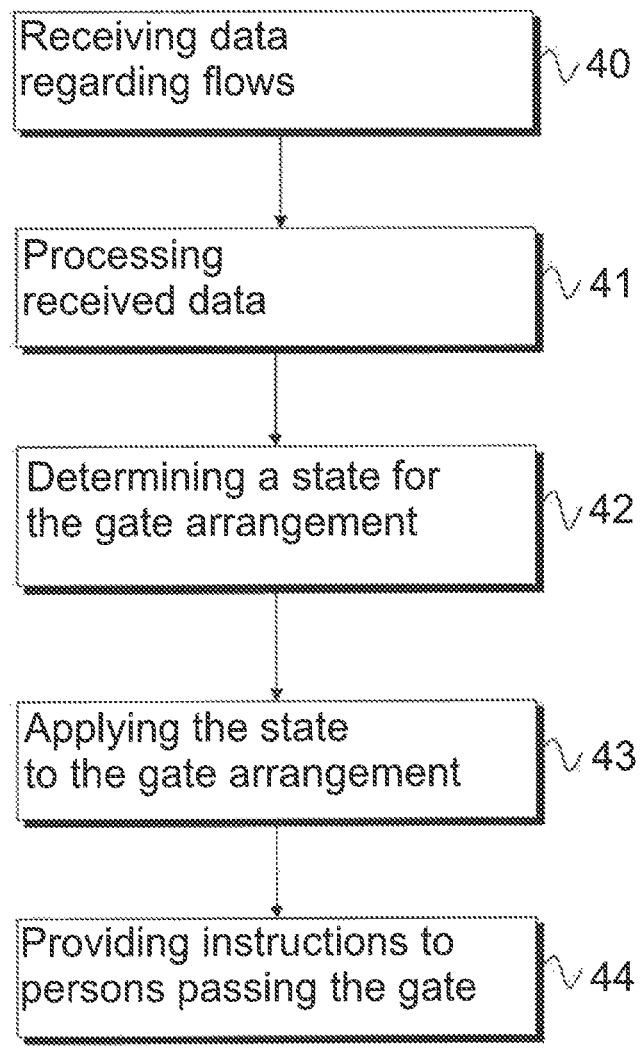
FIG. 4 is a method for controlling an access gate arrangement.

In FIG. 4 a flow chart according to a method is disclosed. In the embodiment a gate arrangement, which may be similar to the gate arrangement disclosed in FIGS. 1-3, is used.

The gate arrangement is configured to receive information from external entities, step 40. This information may be received from different means for counting people and their travelling directions. A typical example is a destination control system for elevators. Other examples include camera systems, light beam equipped gates, escalators and similar. For example, if the gate is installed to a location wherein a train station or stop is nearby it is possible to detect that a train or bus has stopped at the stop and thus, there will be people travelling to higher floors soon.

The received data is then processed, step 41. The processing means, for example, determining the passenger flows that the additional information has revealed and combining the additional information to the present situation. For example, if the present situation is derived from statistics the situation may be fine-tuned with additional information.

When the flows have been estimated or determined, new state for gate arrangement is determined, step 42. The state of the gate arrangement should naturally be optimal to the moment, however, even if it is not fully optimal an increase to the transportation capacity is achieved when compared to the situation where the real time information is not taken into account.

When the state of the gate arrangement has been determined it will be applied to the individual gates, step 43. This may mean changing directions of the gates instantly or allowing few more people to pass so that the gate is changed with delay or the gate is changed to bi-directional mode for a while.

After changing the gates information to passengers is shown accordingly, step 44. The information guiding persons may be changed immediately so that persons wishing to enter or exit the area restricted by the gate arrangement will experience their journey fluent.

The above described method may be implemented as computer software which is executed in a computing device able to communicate with external devices. When the software is executed in a computing device it is configured to perform the above described inventive method. The software is embodied on a computer readable medium so that it can be provided to the computing device, such as the controller 14 of FIG. 1.

As stated above, the components of the exemplary embodiments can include computer readable medium or memories for holding instructions programmed according to the teachings of the present embodiments and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the access gate arrangement may be implemented in various ways. The access gate arrangement and its embodiments are thus not limited to the examples described above; instead they may vary within the scope of the claims.

The invention claimed is:

1. A method for changing state of an access gate arrangement, wherein the access gate arrangement comprises a plurality of access gates, the method comprising:
   receiving data from at least one external apparatus regarding passenger flows, the at least one external apparatus including a destination control system for elevators, and an image device, said destination control system for elevators collecting information about usage of the elevators, the image device collecting information about passenger flows near the plurality of access gates;
   processing said received data;
   determining a state for the access gate arrangement;
   based on the information about usage of the elevator and the information about passenger flows near the plurality of access gate, applying the state to said access gate arrangement; and providing instructions to persons passing said access gate arrangement,
   wherein the state of the access gate arrangement includes an access direction for each individual access gate of the plurality of access gates, and the step of determining the state for the access gate arrangement comprises determining the access direction for each individual access gate of the plurality of access gates based on information obtained from the destination control system for the elevators and the image device, and location of each individual access gate with respect to each elevator, the information obtained from the destination control system includes expected people flow related to each elevator,
   wherein the instructions comprise instructions for choosing an elevator or an elevator group based on the access directions and locations, with respect to the elevator or the elevator group, of access gates through which said persons pass, and
   wherein the instructions are generated without requiring collecting information from individual passengers at the plurality of access gates.

2. The method according to claim 1, wherein said data regarding passenger flows is received from at least one of the following: a destination control system for elevators, camera arrangement, escalator, train control system, light gate and automatic doors.

3. A computer program on a non-transitory computer readable medium for a computing device comprising code adapted to cause, when executed on a data-processing system, the computing device to perform a method comprising the steps of:
   receiving data from at least one external apparatus regarding passenger flows, the at least one external apparatus including a destination control system for elevators, and an image device, said destination control system for elevators collecting information about usage of the elevators, the image device collecting information about passenger flows near the plurality of access gates;
   processing said received data;
   determining a state for the access gate arrangement;
   applying the state to said access gate arrangement; and providing instructions to persons passing said access gate arrangement, wherein the state of the access gate arrangement includes an access direction for each individual access gate of the plurality of access gates, and the step of determining the state for the access gate arrangement comprises determining the access direction for each individual access gate of the plurality of access gates based on information obtained from the destination control system for the elevators and the image device, and location of each individual access gate with respect to each elevator, the information obtained from the destination control system includes expected people flow related to each elevator, wherein the instructions comprise instructions for choosing an elevator or an elevator group based on the access directions and locations, with respect to the elevator or the elevator group, of access gates through which said persons pass, and wherein the instructions are generated without requiring collecting information from individual passengers at the plurality of access gates.

4. The computer program according to claim 3, wherein said data regarding passenger flows is received from at least one of the following: a destination control system for elevators, camera arrangement, escalator, train control system, light gate and automatic doors.

5. An apparatus comprising:

at least one processor configured to execute computer programs;

at least one memory configured to store computer programs and data; and at least one data communication connection configured to communicate with external apparatuses, wherein the apparatus is configured to control an access gate arrangement to:

receive data from at least one external apparatus regarding passenger flows, the at least one external apparatus including a destination control system for elevators, and an image device, said destination control system for elevators collecting information about usage of the elevators, the image device collecting information about passenger flows near the plurality of access gates;

process said received data;

determine a state for the access gate arrangement;

apply the state to said access gate arrangement; and provide instructions to persons passing said access gate arrangement, wherein the state of the access gate arrangement includes an access direction for each individual access gate of the plurality of access gates, and the apparatus is further configured to control the access gate arrangement to determine the access direction for each individual access gate of the plurality of access gates based on information obtained from the destination control system for the elevators and the image device, and location of each individual access gate with respect to each elevator, the information obtained from the destination control system includes expected people flow related to each elevator, wherein the instructions comprise instructions for choosing an elevator or an elevator group based on the access directions and locations, with respect to the elevator or the elevator group, of access gates through which said persons pass, and wherein the instructions are generated without requiring collecting information from individual passengers at the plurality of access gates.

6. The apparatus according claim 5, wherein said apparatus is connected to at least one of the following: a destination control system for elevators, camera arrangement, escalator, train control system, light gate and automatic doors.

7. An access gate arrangement comprising the apparatus according to claim 5.

* * * * *